United States Patent
Ito et al.

(10) Patent No.: US 12,385,110 B2
(45) Date of Patent: *Aug. 12, 2025

(54) PURE COPPER PLATE

(71) Applicant: MITSUBISHI MATERIALS CORPORATION, Tokyo (JP)

(72) Inventors: Yuki Ito, Ageo (JP); Hiroyuki Mori, Tsukuba (JP); Hiroyuki Matsukawa, Sakai (JP); Norihisa Iida, Sakai (JP); Motohiro Hitaka, Sakai (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/311,146

(22) PCT Filed: Dec. 11, 2019

(86) PCT No.: PCT/JP2019/048451
§ 371 (c)(1),
(2) Date: Jun. 4, 2021

(87) PCT Pub. No.: WO2020/122112
PCT Pub. Date: Jun. 18, 2020

(65) Prior Publication Data
US 2022/0025486 A1    Jan. 27, 2022

(30) Foreign Application Priority Data

Dec. 13, 2018 (JP) ................................. 2018-233347
Mar. 29, 2019 (JP) ................................. 2019-068304

(51) Int. Cl.
*C22C 9/00* (2006.01)
*C22F 1/08* (2006.01)

(52) U.S. Cl.
CPC . *C22C 9/00* (2013.01); *C22F 1/08* (2013.01)

(58) Field of Classification Search
None
See application file for complete search history.

(56) References Cited

U.S. PATENT DOCUMENTS 2,114,161 A * 4/1938 Antisell ................. C25D 5/617
                                                                 205/207
6,197,433 B1   3/2001 Hatano
(Continued)

FOREIGN PATENT DOCUMENTS

CN      102712987 A    10/2012
CN      102859672 A     1/2013
(Continued)

OTHER PUBLICATIONS

Stal & Metaller. "Hardness Conversion Table—Tensile Strength, Vickers, Brinell Och Rockwell." https://www.bbshalmstad.se/en/infocenter/hardness-conversion-table/. Accessed Jul. 5, 2023. (Year: 2023).*

(Continued)

*Primary Examiner* — Brian D Walck
(74) *Attorney, Agent, or Firm* — Leason Ellis LLP; Melvin C. Garner; Mitsuhiro Haraguchi

(57) ABSTRACT

This pure copper plate includes Cu having a purity of 99.96 mass % or higher, with a remainder of unavoidable impurities, wherein an amount of P is 2 mass ppm or less, and a total amount of Pb, Se, and Te is 10 mass ppm or less. The amount of S may be in a range of 2 mass ppm or more and 20 mass ppm or less.

5 Claims, 1 Drawing Sheet

(56) References Cited

U.S. PATENT DOCUMENTS

| | | | |
|---|---|---|---|
| 2001/0023726 A1* | 9/2001 | Koenigsmann | C23C 14/3414 148/681 |
| 2002/0014289 A1 | 2/2002 | Nagano et al. | |
| 2015/0308009 A1 | 10/2015 | Nakaya | |
| 2016/0047017 A1* | 2/2016 | Maki | H01B 1/026 420/496 |
| 2020/0173048 A1 | 6/2020 | Tarutani et al. | |

FOREIGN PATENT DOCUMENTS

| | | | | |
|---|---|---|---|---|
| CN | 105189792 | A | 12/2015 | |
| CN | 105452501 | A | 3/2016 | |
| CN | 108766661 | A | 11/2018 | |
| EP | 3279346 | A1 | 2/2018 | |
| JP | 46032333 | B | 9/1971 | |
| JP | 62-282797 | A | 12/1987 | |
| JP | 06-002058 | A | 1/1994 | |
| JP | 2000-212660 | A | 8/2000 | |
| JP | 3324228 | B | 9/2002 | |
| JP | 2004-143469 | A | 5/2004 | |
| JP | 2012094292 | A | 5/2012 | |
| JP | 2012-197466 | A | 10/2012 | |
| JP | 2013185238 | A | * 9/2013 | C22C 9/00 |
| JP | 5344070 | B | 11/2013 | |
| JP | 2015048521 | A | 3/2015 | |
| JP | 2015061950 | A | 4/2015 | |
| JP | 2016156098 | A | 9/2016 | |
| JP | 2017-188339 | A | 10/2017 | |
| KR | 1020140037962 | A | 3/2014 | |
| TW | 201720938 | A | 6/2017 | |
| WO | 2013021969 | A1 | 2/2013 | |
| WO | 2016158589 | A1 | 10/2016 | |
| WO | WO-2018/180645 | A1 | 10/2018 | |
| WO | WO-2018/181593 | A1 | 10/2018 | |
| WO | 2018221724 | A1 | 12/2018 | |

OTHER PUBLICATIONS

English language machine translation of JP-2013185238-A. Generated Oct. 29, 2024. (Year: 2024).*

International Search Report mailed Mar. 17, 2020 for the corresponding PCT International Patent Application No. PCT/JP2019/048451.

Japanese Office Action mailed Jul. 23, 2019 for the corresponding Japanese Patent Application No. 2019-068304.

Japanese Decision of Rejection mailed Nov. 12, 2019 for the corresponding Japanese Patent Application No. 2019-068304.

European Search Report mailed Sep. 20, 2022 for the corresponding European Patent Application No. 19894485.2. (11 pages).

Chinese Office Action mailed Dec. 20, 2021 for the corresponding Chiense Patent Application No. 201980072918.8.

Kronberg et al., "Secondary Recrystallization in Copper", Metals Transactions, Aug. 1949, pp. 501-514, vol. 185.

D. G. Brandon, The Structure of High-Angle Grain Boundaries, Acta Metallurgica, Nov. 14, 1966, pp. 1479-1484, vol. 14.

International Search Report mailed Nov. 24, 2020 for the related International Patent Application No. PCT/JP2020/034462.

Wu Weihua, "Research present situation of grain refinement methods of copper and copper alloys", Hunan Metallurgy, Sep. 30, 2006, pp. 44-48, vol. 34, Issue 5.

Simon Tardieu et al, "Nanostructured 1% silver-copper composite wires with a high tensile strength and a high electrical conductivity", Materials Science and Engineering: A, Jul. 22, 2019, pp. 1-8.

Chinese Notice of Allowance mailed Apr. 26, 2022 for the related Chinese Patent Application No. 202080059341.X.

European Search Report mailed Aug. 22, 2023 for the related European Patent Application No. 20870402.3 (7 pages).

Sui Sujuan et al., "Development of Oxygen-Free Copper (TU2) Wider-Thicker Plate Billet", Non-Ferrous Mining and Metallurgy, vol. 22, Issue 3, Jun. 30, 2006 (4 pages including English abstract).

Chinese Office Action mailed Dec. 21, 2023 for the corresponding Chinese Patent Application No. 202211648894.6 (22 pages including English translation).

Taiwanese Office Action mailed May 2, 2024 for the corresponding Taiwanese Patent Application No. 109133046 (5 pages including English translation).

Office Action of related U.S. Appl. No. 17/762,267 dated Jun. 10, 2025, 9 pages.

"Handbook of Processing of Heavy Nonferrous Metal Materials, vol. 1", compiled by the compilation team of "Handbook of Processing of Heavy Nonferrous Metal Materials", p. 5, published by Metallurgical Industry Press in Jun. 1979, first edition, first printing; total 6 pages including English translation.

Notification of Reexamination mailed Jun. 10, 2025, for the corresponding Chinese Patent Application No. 201980072918.8; total 13 pages including English translation.

* cited by examiner

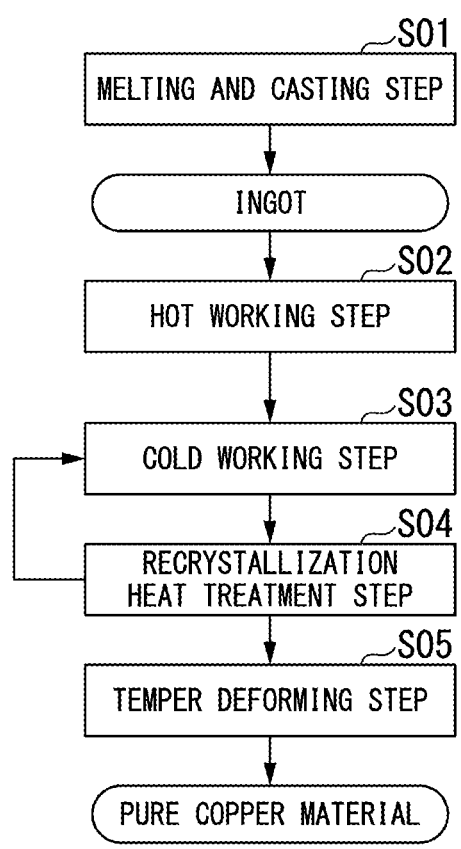

PURE COPPER PLATE

CROSS-REFERENCE TO RELATED PATENT APPLICATIONS

This application is a U.S. National Phase Application under 35 U.S.C. § 371 of International Patent Application No. PCT/JP2019/048451 filed on Dec. 11, 2019 and claims the benefit of priority to Japanese Patent Applications No. 2018-233347 filed on Dec. 13, 2018, and No. 2019-068304 filed on Mar. 29, 2019, all of which are incorporated herein by reference in their entirety. The International Application was published in Japanese on Jun. 18, 2020 as International Publication No. WO/2020/122112 under PCT Article 21(2).

FIELD OF THE INVENTION

The present invention relates to a pure copper plate which is suitable for electrical or electronic components (electrical components or electronic components) such as heat sinks or thick copper circuits (circuits provided with a thick copper pattern) and, particularly, in which the coarsening of crystal grains during heating is suppressed.

BACKGROUND OF THE INVENTION

Conventionally, highly conductive copper or copper alloy has been used for electrical or electronic components such as heat sinks or thick copper circuits.

Recently, in response to an increase in the current in electronic devices, electric devices, or the like, attempts have been made to increase the sizes and thicknesses of electrical or electronic components that are used in these electronic devices, electric devices, or the like in order to decrease the current density and the diffusion of heat attributed to Joule heat generation.

In semiconductor devices, for example, an insulating circuit substrate or the like in which a copper material is joined to a ceramic substrate to form the above-described heat sink or thick copper circuit is used.

At the time of joining the ceramic substrate and a copper plate, the joining temperature is often set to 800° C. or higher, and there is a concern that the crystal grains of the copper material that forms the heat sink or the thick copper circuit may become coarse during joining. Particularly, in copper materials made of pure copper that is particularly excellent in terms of the electrical conductivity and the heat dissipation property, there is a tendency that crystal grains are likely to become coarse.

In a case where the crystal grains become coarse in the heat sink or the thick copper circuit after joining, there is a concern that a problem may be caused in terms of the appearance due to the coarsening of the crystal grains.

For example, Japanese Unexamined Patent Application, First Publication No. H06-002058 proposes a pure copper material in which the growth of crystal grains is suppressed.

Japanese Unexamined Patent Application, First Publication No. H06-002058 describes that the pure copper material contains 0.0006 to 0.0015 wt % of S; and thereby, it is possible to adjust the crystal grains to a certain size even when a heat treatment is performed at a recrystallization temperature or higher.

By the way, in Japanese Unexamined Patent Application, First Publication No. H06-002058, the coarsening of the crystal grains is suppressed by specifying the amount of S; however, depending on the heat treatment conditions, there is a case where it is not possible to obtain an effect of sufficiently suppressing the coarsening of the crystal grains only by specifying the amount of S. In addition, there is a case where, after heating, the crystal grains locally become coarse and the crystal structure becomes nonuniform.

Furthermore, in the case of increasing the amount of S in order to suppress the coarsening of the crystal grains, there is a problem in that the hot workability greatly degrades and the manufacturing yield of pure copper materials greatly decreases.

PRIOR ART DOCUMENTS

Patent Document
Patent Document 1: Japanese Unexamined Patent Application, First Publication No. H06-002058

Problems to be Solved by the Invention

The present invention has been made in view of the above-described circumstances, and an object of the present invention is to provide a pure copper plate that is excellent in terms of hot workability and is capable of suppressing crystal grains becoming coarse and nonuniform even after heating.

SUMMARY OF THE INVENTION

Solutions for Solving the Problems

In order to solve this problem, the present inventors performed intensive studies and found the following fact. There is an impurity element contained in a small amount in a pure copper plate that has an effect of suppressing the coarsening of crystal grains (effect of suppressing the growth of the crystal grains) by being present at crystal grain boundaries. Therefore, it is possible to suppress the crystal grains becoming coarse or nonuniform even after heating by utilizing the element having this effect of suppressing the growth of the crystal grains (hereinafter, referred to as the element of suppressing the growth of crystal grains (crystal grain growth-suppressing element)). In addition, it was found that, in order for this crystal grain growth-suppressing element to act sufficiently, it is effective to regulate the amount of the specific element.

It should be noted that the effect of suppressing the growth of crystal grains is also referred to as the crystal grain growth-suppressing effect, and the effect of suppressing the coarsening of crystal grains is also referred to as the effect of suppressing the coarsening of crystal grains.

The present invention has been made based on the above-described findings, and, a pure copper plate according to one aspect of the present invention includes Cu having a purity of 99.96 mass % or higher with a remainder being unavoidable impurities, in which an amount of P is 2 mass ppm or less, and a total amount of Pb, Se, and Te is 10 mass ppm or less.

According to the pure copper plate having this configuration, since the amount of P is set to 2 mass ppm or less, it is possible to suppress the effect of a crystal grain growth-suppressing element present in a small amount in grain boundaries being impaired by P that segregates earlier in the grain boundaries, and it becomes possible to suppress crystal grains becoming coarse or nonuniform even after heating.

In addition, elements such as Pb, Se, and Te fall into the category of a crystal grain growth-suppressing element that has a low solid solubility limit in Cu and segregates in grain boundaries to suppress the coarsening of crystal grains.

Therefore, Pb, Se, and Te may be contained in a small amount, but these elements also have an effect of greatly degrading hot workability. Therefore, the total amount of Pb, Se, and Te is limited to 10 mass ppm or less, and particularly, the amount of Pb is set to 3 mass ppm or less; and thereby, it is possible to ensure hot workability.

In the pure copper plate according to one aspect of the present invention, it is preferable that an amount of S be in a range of 2 mass ppm or more and 20 mass ppm or less.

In this case, 2 mass ppm or more of S falling into the category of the above-described crystal grain growth-suppressing element is contained; and thereby, it becomes possible to reliably suppress crystal grains becoming coarse or nonuniform even after heating. In addition, the amount of S is limited to 20 mass ppm or less; and thereby, it is possible to sufficiently ensure hot workability.

In addition, in the pure copper plate according to one aspect of the present invention, it is preferable that a total amount of Mg, Sr, Ba, Ti, Zr, Hf, and Y be 10 mass ppm or less.

Since elements such as Mg, Sr, Ba, Ti, Zr, Hf, and Y, which may be contained as unavoidable impurities, generate a compound with S, Se, Te, Pb, or the like, which is the crystal grain growth-suppressing element, there is a concern that the elements may impair the action of the crystal grain growth-suppressing elements. Therefore, the total amount of Mg, Sr, Ba, Ti, Zr, Hf, and Y is limited to 10 mass ppm or less; and thereby, it is possible for the crystal grain growth-suppressing element to sufficiently exhibit the crystal grain growth-suppressing effect, and it becomes possible to reliably suppress crystal grains becoming coarse or nonuniform even after heating.

Furthermore, in the pure copper plate according to one aspect of the present invention, it is preferable that a grain size of crystal grains in a rolled surface be 10 µm or more.

In this case, since the grain size of the crystal grain in the rolled surface is set to 10 µm or more, it is possible to suppress the acceleration of crystal grains becoming coarse and the structure becoming nonuniform when the pure copper plate is heated to 800° C. or higher.

It should be noted that the grain size of the crystal grains is also referred to as the crystal grain size.

Furthermore, in the pure copper plate according to one aspect of the present invention, it is preferable that an aspect ratio of crystal grains in a rolled surface be 2 or less.

In this case, since the aspect ratio of the crystal grains in the rolled surface is set to 2 or less, the degree of working is low, and large strain is not accumulated. That is, the dislocation density is low. Therefore, the driving force for recrystallization attributed to the dislocation density becomes small, and it becomes possible to further suppress crystal grains becoming coarse after heating. The value of the aspect ratio herein is expressed as a value obtained by dividing the major axis by the minor axis, that is, major axis/minor axis.

In addition, in the pure copper plate according to one aspect of the present invention, it is preferable that a crystal grain size after a heat treatment of holding the pure copper plate at 800° C. for 1 hour be in a range of 100 µm or more and 300 µm or less.

In this case, since the crystal grain size after the heat treatment of holding the pure copper plate at 800° C. for 1 hour is in the range of 100 µm or more and 300 µm or less, it is possible to reliably suppress crystal grains becoming coarse even after heating.

In the pure copper plate according to one aspect of the present invention, it is preferable that the crystal grain size after the pure copper plate is heated at 800° C. or higher and joined to a ceramic substrate be in a range of 100 µm or more and 300 µm or less.

In addition, in the pure copper plate according to one aspect of the present invention, it is preferable that a ratio $d_{max}/d_{ave}$ of a maximum crystal grain size $d_{max}$ to an average crystal grain size $d_{ave}$ within a range of 50 mm×50 mm after the heat treatment of holding the pure copper plate at 800° C. for 1 hour be 10 or less.

In this case, since the ratio $d_{max}/d_{ave}$ of the maximum crystal grain size $d_{max}$ to the average crystal grain size $d_{ave}$ after the heat treatment of holding the pure copper plate at 800° C. for 1 hour is set to 10 or less, it is possible to reliably suppress crystal grains becoming nonuniform even after heating.

Furthermore, in the pure copper plate according to one aspect of the present invention, it is preferable that a tensile strength be 500 MPa or lower.

In this case, since the tensile strength is 500 MPa or lower, and characteristics as a pure copper plate are ensured, the pure copper plate is particularly suitable as a material for electrical or electronic components for high-current uses.

Effects of Invention

According to one aspect of the present invention, it is possible to provide a pure copper plate that is excellent in terms of hot workability and is capable of suppressing crystal grains becoming coarse and nonuniform even after heating.

BRIEF DESCRIPTION OF THE DRAWINGS

The FIGURE is a flowchart of a method for manufacturing a pure copper plate according to the present embodiment.

DETAILED DESCRIPTION OF THE INVENTION

Hereinafter, a pure copper plate according to an embodiment of the present invention will be described.

The pure copper plate of the present embodiment is used as a material for electrical or electronic components of heat sinks, thick copper circuits, and the like, and, at the time of molding (forming) the above-described electrical or electronic components, the pure copper plate is used in a state of being, for example, heated at 800° C. or higher and joined to a ceramic substrate.

In the pure copper plate of the present embodiment, the purity of Cu is set to 99.96 mass % or higher, the remainder is unavoidable impurities, the amount of P is set to 2 mass ppm or less, and the total amount of Pb, Se, and Te is set to 10 mass ppm or less.

In addition, in the pure copper plate of the present embodiment, it is preferable that the amount of S be set to be in a range of 2 mass ppm or more and 20 mass ppm or less.

Furthermore, in the pure copper plate of the present embodiment, it is preferable that the total amount of Mg, Sr, Ba, Ti, Zr, Hf, and Y, which are unavoidable impurities, be 10 mass ppm or less.

That is, the composition of the pure copper plate can also be as described below.

The pure copper plate contains 99.96 mass % or more of Cu and 2 mass ppm or less of P and further contains one or more selected from Pb, Se, and Te in a total amount of 10 mass ppm or less, and the remainder is unavoidable impurities. The pure copper plate preferably further contains 2 mass ppm or more and 20 mass ppm or less of S. The pure copper plate preferably further contains one or more selected from Mg, Sr, Ba, Ti, Zr, Hf, and Y in a total amount of 10 mass ppm or less.

Regarding the elements other than Cu, the amounts thereof are within the above-described ranges regardless of whether the elements are contained as unavoidable impurities or intentionally. In addition, it is also possible to say that the elements other than Cu are unavoidable impurities. It is also possible to say that the unavoidable impurities as the remainder are elements other than the elements whose amounts are specified above.

In addition, in the pure copper plate of the present embodiment, it is preferable that the grain size of crystal grains in a rolled surface be 10 μm or more.

Furthermore, in the pure copper plate of the present embodiment, it is preferable that the aspect ratio of the crystal grains in the rolled surface be 2 or less.

In addition, in the pure copper plate of the present embodiment, it is preferable that the crystal grain size after a heat treatment of holding the pure copper plate at 800° C. for 1 hour be in a range of 100 μm or more and 300 μm or less.

In the pure copper plate of the present embodiment, it is preferable that the crystal grain size after the pure copper plate is heated at 800° C. or higher and joined to a ceramic substrate be in a range of 100 μm or more and 300 μm or less.

Furthermore, in the pure copper plate of the present embodiment, it is preferable that the ratio $d_{max}/d_{ave}$ of the maximum crystal grain size $d_{max}$ to the average crystal grain size $d_{ave}$ within a range of 50 mm×50 mm after the heat treatment of holding the pure copper plate at 800° C. for 1 hour be 10 or less.

In addition, in the pure copper plate of the present embodiment, it is preferable that the tensile strength be 500 MPa or lower.

The grain size of the crystal grains, the aspect ratio of the crystal grains, the crystal grain size after the heat treatment, and the maximum crystal grain size $d_{max}$ and the average crystal grain size $d_{ave}$ after the heat treatment are values that are measured by evaluation methods described in examples described below.

The reasons for specifying the component composition and a variety of characteristics as described above in the pure copper plate of the present embodiment will be described below.

(Purity of Cu: 99.96 Mass % or Higher)

In electrical or electronic components for high-current uses, there is a demand for excellent electrical conductivity and an excellent heat dissipation property in order to suppress the generation of heat during electrical conduction, and pure copper, which is particularly excellent in terms of the electrical conductivity and the heat dissipation property, is preferably used.

Therefore, in the pure copper plate of the present embodiment, the purity of Cu is specified as 99.96 mass % or higher.

It should be noted that the purity of Cu is preferably 99.965 mass % or higher and more preferably 99.97 mass % or higher. In addition, the upper limit of the purity of Cu is not particularly limited, but is preferably set to 99.999 mass % or lower since, in a case where the upper limit exceeds 99.999 mass %, a special refining step is required, and the manufacturing cost greatly increases.

(Amount of P: 2 Mass Ppm or Less)

P contained as an unavoidable impurity is widely used as a deoxidizing element in copper. However, in a case where P is contained in a certain amount or more (a specific amount or more), P impairs the action of not only oxygen but also the crystal grain growth-suppressing element present in crystal grain boundaries. Therefore, at the time of heating the pure copper plate to a high temperature, there is a concern that the crystal grain growth-suppressing element may not sufficiently act and crystal grains may become coarse and nonuniform.

Therefore, in the present embodiment, the amount of P is limited to 2 mass ppm or less.

It should be noted that the amount of P is preferably set to 1.5 mass ppm or less and more preferably set to 1 mass ppm or less. In a case where the amount of P is set to less than 0.001 mass ppm, it only increases the cost. Therefore, the amount of P is preferably 0.001 mass ppm or more, more preferably 0.005 ppm or more, and still more preferably 0.01 mass ppm or more.

(Total Amount of Pb, Se, and Te: 10 Mass Ppm or Less)

Pb, Se, and Te are elements that have a low solid solubility limit in Cu, have an action of suppressing the coarsening of crystal grains by segregating in grain boundaries, and greatly degrade hot workability.

Therefore, in the present embodiment, the total amount of Pb, Se, and Te is limited to 10 mass ppm or less in order to ensure hot workability.

It should be noted that, in the case of further improving hot workability, the total amount of Pb, Se, and Te is preferably set to 9 mass ppm or less and more preferably set to 8 mass ppm or less. Particularly, the amount of Pb is preferably set to 3 mass ppm or less and more preferably set to 2.5 mass ppm or less in order to ensure favorable hot workability. In a case where the total amount of Pb, Se, and Te is set to less than 0.01 mass ppm, the effect of suppressing the growth of crystal grains becomes small, and the cost becomes high. Therefore, the total amount of Pb, Se, and Te is preferably set to 0.01 mass ppm or more.

(Amount of S: 2 Mass Ppm or More and 20 Mass Ppm or Less)

S is an element that has an action of suppressing the coarsening of crystal grains by suppressing the migration of crystal grain boundaries and degrades hot workability.

Therefore, in a case where the amount of S is set to 2 mass ppm or more in the present embodiment, it is possible for the crystal grain coarsening-suppressing effect of S to be sufficiently exhibited, and it becomes possible to reliably suppress crystal grains becoming coarse even after heating. On the other hand, in a case where the amount of S is limited to 20 mass ppm or less, it becomes possible to ensure hot workability.

It should be noted that the lower limit of the amount of S is preferably 2.5 mass ppm or more and more preferably 3 mass ppm or more. In addition, the upper limit of the amount of S is preferably 17.5 mass ppm or less and more preferably 15 mass ppm or less.

(Total Amount of Mg, Sr, Ba, Ti, Zr, Hf, Y: 10 Mass Ppm or Less)

Mg, Sr, Ba, Ti, Zr, Hf, and Y that are contained as unavoidable impurities generate a compound with the crystal grain growth-suppressing element (S, Se, Te, Pb, or the like) that suppresses the coarsening of crystal grains, and there is a concern that these elements may impair the action of the crystal grain growth-suppressing elements.

Therefore, in order to reliably suppress the coarsening of crystal grains after heating, the total amount of Mg, Sr, Ba, Ti, Zr, Hf, and Y is preferably set to 10 mass ppm or less.

It should be noted that the total amount of Mg, Sr, Ba, Ti, Zr, Hf, and Y is preferably 7.5 mass ppm or less and more preferably 5 mass ppm or less. In a case where the total amount of Mg, Sr, Ba, Ti, Zr, Hf, and Y is set to less than 0.01 mass ppm, it only increases the cost. Therefore, the total amount of Mg, Sr, Ba, Ti, Zr, Hf, and Y is preferably set to 0.01 mass ppm or more.

(Other Unavoidable Impurities)

As other unavoidable impurities other than the above-described elements, Ag, B, Bi, Ca, Sc, rare earth elements (excluding Y and Sc), V, Nb, Ta, Cr, Mo, W, Mn, Re, Fe, Ru, Os, Co, Rh, Ir, Ni, Pd, Pt, Au, Zn, Cd, Hg, Al, Ga, In, Ge, Sn, As, Sb, Tl, Be, N, C, Si, Li, H, O, and the like are exemplified. Since there is a concern that these unavoidable impurities may decrease the electrical conductivity, the total amount of these unavoidable impurities is preferably set to 0.035 mass % or less.

(Grain Size of Crystal Grains in Rolled Surface: 10 µm or More)

In the pure copper plate of the present embodiment, in a case where the grain size of the crystal grains in a rolled surface is fine, recrystallization is likely to proceed at the time of heating the pure copper plate to, for example, 800° C. or higher, and there is a concern that the crystal grains and the structure may be accelerated to become coarse and nonuniform, respectively.

Therefore, in order to further suppress the coarsening of the crystal grains, the grain size of the crystal grains in the rolled surface is preferably set to 10 µm or more.

It should be noted that the grain size of the crystal grains in the rolled surface is preferably 15 µm or more and more preferably 20 µm or more. The grain size of the crystal grains in the rolled surface is more preferably 25 µm or more, still more preferably 30 µm or more, and most preferably more than 40 µm. In a case where the crystal grain size is set to more than 300 µm, it increases the cost. In addition, the crystal grain size after holding the pure copper plate at 800° C. for 1 hour exceeds 300 µm. Therefore, the grain size of the crystal grains in the rolled surface is preferably 300 µm or less, more preferably 270 µm or less, and still more preferably 250 µm or less.

(Aspect Ratio of Crystal Grains in Rolled Surface: 2 or Less)

The aspect ratio of the crystal grains is an index that indicates the degree of working of a material. As the aspect ratio increases, the degree of working becomes higher, and the dislocation density accumulated in the material becomes higher, that is, the strain energy becomes higher. In a case where the strain energy accumulated in the material is high, the driving force at the time of causing recrystallization becomes high, and the crystal grains are likely to become coarse during heating.

Therefore, in order to further suppress the coarsening of the crystal grains, the aspect ratio of the crystal grains in the rolled surface is preferably set to 2 or less. The value of the aspect ratio mentioned herein is represented by a value obtained by dividing the major axis calculated by a method for measuring the aspect ratio of crystal grains described below by the minor axis also calculated by the same measurement method described below, that is, the average value of the major axis/the minor axis.

It should be noted that the aspect ratio of the crystal grains in the rolled surface is preferably 1.9 or less and more preferably 1.8 or less. The substantial lower limit of the aspect ratio of the crystal grains in the rolled surface is 0.5.

(Crystal Grain Size after Heat Treatment of Holding Pure Copper Plate at 800° C. for 1 Hour: 100 µm or More and 300 µm or Less)

In the pure copper plate of the present embodiment, in a case where the crystal grain size after the heat treatment of holding the pure copper plate at 800° C. for 1 hour is in a range of 100 µm or more and 300 µm or less, it is possible to reliably suppress the coarsening of the crystal grains even in the case of heating the pure copper plate to 800° C. or higher, and the pure copper plate is particularly suitable as a material for thick copper circuits or heat sinks that are joined to ceramic substrates.

It should be noted that the lower limit of the crystal grain size after the heat treatment of holding the pure copper plate at 800° C. for 1 hour is preferably 110 µm or more and more preferably 120 µm or more. In addition, the upper limit of the crystal grain size after the heat treatment of holding the pure copper plate at 800° C. for 1 hour is preferably 290 µm or less and more preferably 280 µm or less.

($d_{max}/d_{ave}$ after Heat Treatment of Holding Pure Copper Plate at 800° C. for 1 Hour: 10 or Less)

In the pure copper plate of the present embodiment, in a case where the ratio $d_{max}/d_{ave}$ of the maximum crystal grain size $d_{max}$ to the average crystal grain size $d_{ave}$ within a range (region) of 50 mm×50 mm after the heat treatment of holding the pure copper plate at 800° C. for 1 hour is 10 or less, it is possible to reliably suppress the crystal grains becoming nonuniform even in the case of heating the pure copper plate to 800° C. or higher, and the pure copper plate is particularly suitable as a material for thick copper circuits or heat sinks that are joined to ceramic substrates.

It should be noted that the ratio $d_{max}/d_{ave}$ of the maximum crystal grain size $d_{max}$ to the average crystal grain size $d_{ave}$ within a range of 50 mm×50 mm after the heat treatment of holding the pure copper plate at 800° C. for 1 hour is preferably 9 or less and more preferably 8 or less. The lower limit of the ratio $d_{max}/d_{ave}$ of the maximum crystal grain size $d_{max}$ to the average crystal grain size $d_{ave}$ is preferably more than 1.03 and more preferably more than 1.05.

(Tensile Strength: 500 MPa or Lower)

In the pure copper plate of the present embodiment, the tensile strength is set to 500 MPa or lower; and thereby, characteristics as a pure copper plate are ensured, and the pure copper plate is particularly suitable as a material for electrical or electronic components for high-current uses.

It should be noted that the tensile strength of the pure copper plate is preferably 475 MPa or lower, more preferably 450 MPa or lower, still more preferably 400 MPa or lower, and most preferably 350 MPa or lower. The lower limit of the tensile strength of the pure copper plate is not particularly limited, but is preferably 100 MPa or higher.

Next, a method for manufacturing the pure copper plate of the present embodiment configured as described above, will be described with reference to the flowchart shown in FIGURE.

(Melting and Casting Step S01)

First, a copper raw material purified such that the amount of P reaches 0.001 mass ppm or less is melted to produce molten copper. It should be noted that, as the copper raw material, for example, 4N Cu having a purity of 99.99 mass % or higher or 5N Cu having a purity of 99.999 mass % or higher is preferably used.

It should be noted that, in the case of adding S, it is possible to use a pure S, a Cu—S mother alloy, or the like. It should be noted that, in the case of manufacturing a Cu—S base alloy as well, 4N Cu having a purity of 99.99 mass % or higher or 5N Cu having a purity of 99.999 mass % or higher is preferably used.

In addition, in the melting step, atmosphere melting using an inert gas atmosphere in which the vapor pressure of $H_2O$ is low (for example, Ar gas) is performed in order to decrease the hydrogen concentration, and the retention time during melting is preferably kept to the minimum.

Then, the molten copper in which the component is adjusted is poured into a casting mold to produce an ingot. It should be noted that, in the case of taking mass production into account, a continuous casting method or a semi-continuous casting method is preferably used.

(Hot Working Step S02)

Next, hot working is performed in order to make the structure uniform.

The hot working temperature is not particularly limited, but is preferably set to be in a range of 500° C. or higher and 1000° C. or lower.

In addition, the total working rate of the hot working is preferably set to 50% or more, more preferably set to 60% or more, and still more preferably 70% or more.

Furthermore, the cooling method after the hot working is not particularly limited, but air cooling or water cooling is preferably performed.

In addition, the working method in the hot working step S02 is not particularly limited, and it is possible to adopt, for example, rolling, extrusion, groove rolling, forging, pressing, or the like. In a case where the final shape is a plate or a strip, rolling is preferably adopted.

(Cold Working Step S03)

Next, cold working is performed on the copper material that has been subjected to the hot working step S02 to work the copper material into a predetermined shape. It should be noted that the temperature condition in the cold working step S03 is not particularly limited, but the cold working is preferably performed in a range of −200° C. or higher and 200° C. or lower. In addition, the working rate in the cold working step S03 is appropriately selected so as to work the copper material into a shape similar to the final shape, and the working rate is preferably set to 30% or more in order to improve the productivity.

In addition, the working method in the cold working step S03 is not particularly limited, and it is possible to adopt, for example, rolling, extrusion, groove rolling, forging, pressing, or the like. In a case where the final shape is a plate or a strip, rolling is preferably adopted.

(Recrystallization Heat Treatment Step S04)

Next, a heat treatment is performed on the copper material that has been subjected to the cold working step S03 for the purpose of recrystallization. The grain size of recrystallized grains is desirably 10 µm or more. In a case where the recrystallized grains are fine, there is a concern that, when the copper material is heated to 800° C. or higher afterwards, the crystal grains and the structure may be accelerated to become coarse and nonuniform, respectively.

The heat treatment conditions in the recrystallization heat treatment step S04 are not particularly limited, but the copper material is preferably held at a heat treatment temperature in a range of 200° C. or higher and 900° C. or lower for 1 second or longer and 10 hours or shorter.

Examples thereof include a heat treatment at 350° C. for 6 h (6 hours), a heat treatment at 700° C. for 1 h (1 hour), a heat treatment at 850° C. for 5 seconds, and the like.

In addition, in order to make the recrystallization structure uniform, the cold working step S03 and the recrystallization heat treatment step S04 may be repeated twice or more.

(Temper Deforming Step S05)

Next, temper deforming may be performed on the copper material that has been subjected to the recrystallization heat treatment step S04 in order to adjust the material strength. It should be noted that, in a case where there is no need to increase the material strength, temper deforming may not be performed.

The working rate of the temper deforming is not particularly limited, but temper deforming is preferably performed at a working rate in a range of more than 0% and 50% or less in order to adjust the material strength. In addition, in a case where the aspect ratio of the crystal grains in the rolled surface is set to 2.0 or less, the working rate is preferably limited to 40% or less.

In addition, if necessary, a heat treatment may be further performed after the temper deforming in order to remove residual strain.

The pure copper plate of the present embodiment is manufactured as described above.

According to the pure copper plate of the present embodiment configured as described above, since the amount of P is set to 2 mass ppm or less, it is possible to suppress the effect of the crystal grain growth-suppressing element present in a small amount in the grain boundaries being impaired by P, and it becomes possible to suppress the crystal grains becoming coarse or nonuniform even after heating.

In addition, the elements such as Pb, Se, and Te have a low solid solubility limit in Cu and segregate in the grain boundaries to suppress the coarsening of crystal grains. Therefore, Pb, Se, and Te fall into the category of the crystal grain growth-suppressing element and thus may be contained in a small amount. However, these elements greatly degrade hot workability. Since Pb, Se, and Te are elements that degrade hot workability as described above, hot workability can be ensured by limiting the total amount of Pb, Se, and Te to 10 mass ppm or less.

In addition, in the present embodiment, in a case where the amount of S is set to be in a range of 2 mass ppm or more and 20 mass ppm or less, S, which is one kind of crystal grain growth-suppressing element, segregates in the grain boundaries, and it becomes possible to reliably suppress the crystal grains becoming coarse and nonuniform during heating. In addition, it is possible to ensure hot workability.

Furthermore, in the present embodiment, in a case where the total amount of Mg, Sr, Ba, Ti, Zr, Hf, and Y is 10 mass ppm or less, it is possible to suppress these elements generating a compound with S, Se, Te, Pb, or the like, which is a crystal grain growth-suppressing element. Thereby, it is possible for the action of the crystal grain growth-suppressing element to be sufficiently exhibited, and it becomes possible to reliably suppress crystal grains becoming coarse and nonuniform during heating.

Furthermore, in the present embodiment, in a case where the grain size of the crystal grains in the rolled surface are 10 µm or more, it is possible to suppress the progress of recrystallization at the time of heating the pure copper plate to, for example, 800° C. or higher, and it is possible to suppress the crystal grains becoming coarse and the structure becoming nonuniform.

Furthermore, in the present embodiment, in a case where the aspect ratio of the crystal grains in the rolled surface is 2 or less, since the degree of working is low, and large strain is not accumulated, the driving force for recrystallization becomes small, and it becomes possible to further suppress the coarsening of the crystal grains after heating.

In addition, in the present embodiment, in a case where the crystal grain size after the heat treatment of holding the pure copper plate at 800° C. for 1 hour is in a range of 100 µm or more and 300 µm or less, it is possible to reliably suppress the crystal grains becoming coarse even after heating.

Furthermore, in the present embodiment, in a case where the ratio $d_{max}/d_{ave}$ of the maximum crystal grain size $d_{max}$ to the average crystal grain size $d_{ave}$ within a range of 50 mm×50 mm after the heat treatment of holding the pure copper plate at 800° C. for 1 hour is 10 or less, it is possible to reliably suppress the crystal grains becoming nonuniform even after heating.

Furthermore, in the present embodiment, in a case where the tensile strength is 500 MPa or lower, since characteristics as a pure copper plate are sufficiently ensured, the pure copper plate is suitable as a material for electrical or electronic components for high-current uses.

Hitherto, the pure copper plate, which is an embodiment of the present invention, has been described, but the present invention is not limited thereto and can be appropriately modified as long as the features of the invention are satisfied.

For example, in the above-described embodiment, an example of the method for manufacturing the pure copper plate has been described, but the method for manufacturing the pure copper plate is not limited to the manufacturing method described in the embodiment, and the pure copper plate may be manufactured by appropriately selecting an existing manufacturing method.

Examples

Hereinafter, the results of confirmatory experiments performed to confirm the effects of the present invention will be described.

A copper raw material having a purity of 99.999 mass % or higher was prepared by purifying the amount of P to 0.001 mass ppm or less by a zone melting purification method. In addition, the above-described copper raw material and the variety of elements (Pb, Se, Te, S, Mg, Sr, Ba, Ti, Zr, Hf, and Y) having a purity of 99 mass % or higher were used to produce Cu-1 mass % base alloys of a variety of elements (Cu base alloys containing 1 mass % of the variety of elements).

Thereby, the copper raw material having a purity of 99.999 mass % or higher and the Cu-1 mass % base alloys of the variety of elements were prepared.

The above-described copper raw material was charged into a high-purity graphite crucible and subjected to high-frequency induction melting in an atmosphere furnace having an Ar gas atmosphere. The above-described Cu-1 mass % base alloys of the variety of elements were charged into the obtained molten copper to prepare component compositions shown in Tables 1 and 2. It should be noted that, in Tables 1 and 2, in the column "total of 3 elements", the total amount of Pb, Se, and Te is described. In addition, in the column "total of 7 elements", the total amount of Mg, Sr, Ba, Ti, Zr, Hf, and Y is described.

The obtained molten copper was poured into a casting mold made of a heat-insulating material and cooled at a cooling rate of 0.5° C./sec to produce ingots. It should be noted that the sizes of the ingots were set to a thickness of approximately 25 mm, a width of approximately 60 mm, and a length of approximately 150 to 200 mm.

The obtained ingots were heated in an Ar gas atmosphere for 1 hour under the temperature conditions shown in Tables 3 and 4 and hot-rolled to a thickness of 15 mm.

The copper materials after hot rolling were cut, and surface grinding was performed to remove oxide films on the surfaces. At this time, the thicknesses of the copper materials to be subjected to cold rolling were adjusted such that the final thicknesses became as shown in Tables 3 and 4 in consideration of the rolling rates of subsequent cold rolling and temper rolling.

The copper materials having a thickness adjusted as described above were subjected to cold rolling under the conditions shown in Tables 3 and 4 and water cooling.

Next, the copper materials that had been subjected to the cold rolling were subjected to a recrystallization heat treatment under the conditions shown in Tables 3 and 4.

Then, the copper materials that had been subjected to the recrystallization heat treatment were subjected to temper rolling under the conditions shown in Tables 3 and 4; and thereby, strip materials for characteristic evaluation having a thickness shown in Tables 3 and 4 and a width of 60 mm were manufactured.

Then, evaluation was performed regarding the following items. The evaluation results are shown in Tables 5 and 6.
(Evaluation of Workability)

As the evaluation of the workability, the presence or absence of a cracked edge during the above-described hot rolling and cold rolling was observed. A strip material in which a cracked edge was not or rarely recognized was evaluated as "A". A strip material in which a small cracked edge having a length of less than 1 mm was generated was evaluated as "B". A strip material in which a cracked edge having a length of 1 mm or more and less than 3 mm was generated was evaluated as "C". A strip material in which a cracked edge having a length of 3 mm or more was generated was evaluated as "D".

It should be noted that the length of the cracked edge was the length of the cracked edge from an end portion in the width direction to the central portion in the width direction of the rolled material.
(Tensile Strength)

A No. 13B test piece specified in JIS Z 2201 was collected from the strip material for characteristic evaluation, and the tensile strength was measured by JIS Z 2241.

It should be noted that the test piece was collected such that the tensile direction of a tensile test became parallel to the rolling direction of the strip material for characteristic evaluation.
(Electrical Conductivity)

A test piece having a width of 10 mm and a length of 60 mm was collected from the strip material for characteristic evaluation, and the electrical resistance was measured by the 4-terminal method. In addition, the dimensions of the test piece were measured using a micrometer, and the volume of the test piece was calculated. Then, the electrical conductivity was calculated from the measured electrical resistance value and the measured volume. It should be noted that the test piece was collected such that the longitudinal direction of the test piece became parallel to the rolling direction of the strip material for characteristic evaluation.
(Crystal Grain Size Before Heat Treatment)

A 20 mm×20 mm sample was cut out from the obtained strip material for characteristic evaluation, and the average crystal grain size was measured as described below with a SEM-EBSD (Electron Backscatter Diffraction Patterns) measuring instrument.

A rolled surface was subjected to mechanical polishing using waterproof abrasive paper and diamond abrasive grains. Next, the rolled surface was subjected to finish polishing using a colloidal silica solution. After that, an electron beam was radiated on each measurement point (pixel) in a measurement range on the specimen surface using a scanning electron microscope. By an orientation analysis by electron backscatter diffraction, an interval between the measurement points having an orientation difference between the adjacent measurement points of 15° or higher was referred to as a high-angle grain boundary, and an interval having an orientation difference between the adjacent measurement points of less than 15° was referred to as a low-angle grain boundary. A crystal grain boundary map was produced using the high-angle grain boundaries. Then, in accordance with the intercept method of JIS H 0501, 5 line segments having a predetermined length were drawn at predetermined intervals in each of the vertical direction and the horizontal direction on the crystal grain boundary map. The number of crystal grains that were completely cut was counted, and the average value of the cut lengths was calculated as the crystal grain size before the heat treatment.

(Aspect Ratio of Crystal Grains)

The aspect ratio of the crystal grains in the rolled surface was measured as described below.

For the rolled surface of the above-described strip material for characteristics evaluation, a crystal grain boundary map was produced using the SEM-EBSD (Electron Backscatter Diffraction Patterns) measuring instrument in the same manner as in the above-described measurement of the crystal grain size. On the crystal grain boundary map, 5 line segments in the rolling direction (RD direction) and 5 line segments in the direction perpendicular to the rolling direction (width direction, TD direction) were drawn at predetermined intervals. The number of crystal grains that were completely cut was counted, the grain sizes in the RD direction were defined as the major axes, and the grain sizes in the TD direction were defined as the minor axes. In detail, among the line segments in the RD direction, the length of a line segment that was cut by the contour of 1 crystal grain (the distance between 2 intersection points of the line segment and the contour of the crystal grain) was defined as the major axis of the crystal grain. Among the line segments in the TD direction, the length of a line segment that was cut by the contour of 1 crystal grain was defined as the minor axis of the crystal grain. The ratios of the major axis to the minor axis (major axis/minor axis) of the individual crystal grains were obtained, and the average value thereof was calculated as the aspect ratio.

(Crystal Grain Size after Heat Treatment)

A test piece was collected from the above-described strip material for characteristic evaluation, and a heat treatment was performed by holding the test piece at 800° C. for 1 hour. A 50 mm×50 mm sample was cut out from this test piece, and a rolled surface was subjected to mirror-polishing and etching. The rolled surface was photographed with an optical microscope such that the rolling direction became the horizontal direction of the photograph. Among the observation portions, portions in which crystal grains were finest and the inside of a visual field of approximately 1000×1000 μm² was formed in a uniform grain size were selected, and, in a range of approximately 1000×1000 μm², the crystal grains were observed, and the crystal grain size was measured. According to the intercept method of JIS H 0501, 5 line segments having a predetermined length were drawn at predetermined intervals in each of the vertical direction and the horizontal direction of the photograph. The number of crystal grains that were completely cut was counted, and the average value of the cut lengths was calculated as the crystal grain size (average crystal grain size $d_{ave}$) after the heat treatment.

(Variation of Grain Sizes after Heat Treatment)

Within a range (region) of 50 mm×50 mm of a sample collected from the test piece on which the heat treatment had been performed as described above, the average value of the major axis and the minor axis of the coarsest crystal grain (that is, a value obtained by dividing the sum of the major axis and the minor axis by 2) that was not a twin crystal was defined as the maximum crystal grain size $d_{max}$. The coarsest crystal grain was a crystal grain having the maximum average value of the major axis and the minor axis of the crystal grain in the range of 50 mm×50 mm. The major axis was the length of the longest line segment among line segments connecting 2 points on the contour of the crystal grain. The minor axis was the length of the longest line segment among line segments cut by the grain boundary (the contour of the crystal grain) at the time of drawing the line segments perpendicular to the major axis. A case where the ratio $d_{max}/d_{ave}$ of this maximum crystal grain size to the above-described average crystal grain size $d_{ave}$ was 10 or less was evaluated as "o" (good), and a case where $d_{max}/d_{ave}$ exceeded 10 was evaluated as "x" (bad).

TABLE 1

| | | Component composition (mass ratio) | | | | | | | | | | | | | |
|---|---|---|---|---|---|---|---|---|---|---|---|---|---|---|---|
| | | Cu % | P ppm | Total of 3 elements ppm | Pb ppm | Se ppm | Te ppm | S ppm | Total of 7 elements ppm | Mg ppm | Sr ppm | Ba ppm | Ti ppm | Zr ppm | Hf ppm | Y ppm |
| Invention Examples | 1 | 99.96 or more | 1.00 | 4.2 | 1.4 | 0.2 | 2.6 | 4.9 | 5.6 | 3.00 | 0.10 | 0.50 | 1.10 | 0.10 | 0.10 | 0.70 |
| | 2 | 99.96 or more | 0.80 | 3.4 | 0.4 | 0.2 | 2.8 | 3.6 | 5.5 | 2.10 | 0.50 | 0.10 | 1.10 | 0.20 | 0.90 | 0.60 |
| | 3 | 99.96 or more | 0.50 | 5.2 | 2.9 | 0.8 | 1.5 | 5.9 | 2.3 | 0.10 | 0.30 | 0.40 | 0.40 | 0.50 | 0.20 | 0.40 |
| | 4 | 99.96 or more | 0.70 | 8.1 | 2.8 | 3.0 | 2.3 | 19.3 | 2.8 | 1.00 | 0.30 | 0.20 | 0.80 | 0.10 | 0.20 | 0.20 |
| | 5 | 99.96 or more | 1.90 | 5.3 | 0.5 | 1.9 | 2.9 | 7.2 | 7.0 | 2.70 | 0.20 | 0.40 | 1.80 | 0.80 | 0.70 | 0.40 |
| | 6 | 99.96 or more | 1.20 | 2.0 | 0.7 | 0.9 | 0.4 | 16.0 | 5.2 | 2.80 | 0.50 | 0.10 | 0.30 | 0.10 | 0.50 | 0.90 |
| | 7 | 99.96 or more | 1.50 | 5.7 | 1.1 | 2.8 | 1.8 | 17.0 | 3.0 | 0.40 | 0.20 | 0.30 | 1.00 | 0.10 | 0.50 | 0.50 |
| | 8 | 99.96 or more | 0.70 | 5.7 | 2.1 | 0.9 | 2.7 | 14.5 | 5.5 | 2.60 | 0.40 | 0.50 | 0.30 | 0.40 | 0.70 | 0.60 |
| | 9 | 99.96 or more | 1.10 | 2.0 | 1.0 | 0.8 | 0.2 | 5.3 | 6.9 | 2.60 | 0.40 | 0.10 | 2.00 | 0.90 | 0.60 | 0.30 |
| | 10 | 99.96 or more | 0.90 | 4.0 | 0.2 | 1.6 | 2.2 | 1.8 | 4.8 | 0.40 | 0.40 | 0.30 | 1.90 | 0.90 | 0.40 | 0.50 |
| | 11 | 99.96 or more | 1.70 | 4.3 | 0.3 | 1.1 | 2.9 | 7.1 | 3.4 | 0.90 | 0.10 | 0.10 | 0.80 | 0.10 | 0.50 | 0.90 |
| | 12 | 99.96 or more | 1.90 | 4.8 | 0.2 | 1.6 | 3.0 | 7.9 | 4.7 | 0.60 | 0.10 | 0.30 | 1.60 | 0.30 | 0.80 | 1.00 |
| | 13 | 99.96 or more | 0.40 | 3.9 | 0.8 | 2.1 | 1.0 | 8.7 | 6.2 | 2.70 | 0.50 | 0.50 | 1.20 | 0.60 | 0.50 | 0.20 |
| | 14 | 99.96 or more | 0.20 | 3.7 | 0.2 | 2.0 | 1.5 | 20.5 | 4.4 | 2.10 | 0.10 | 0.10 | 0.50 | 0.30 | 0.40 | 0.90 |
| | 15 | 99.96 or more | 0.30 | 5.9 | 1.1 | 1.9 | 2.9 | 9.8 | 6.1 | 2.30 | 0.10 | 0.30 | 1.40 | 0.40 | 0.90 | 0.70 |
| | 16 | 99.96 or more | 1.00 | 4.5 | 2.0 | 1.0 | 1.5 | 12.3 | 3.5 | 1.10 | 0.40 | 0.20 | 0.10 | 0.20 | 0.60 | 0.90 |
| | 17 | 99.96 or more | 2.00 | 4.8 | 1.9 | 2.3 | 0.6 | 11.1 | 4.0 | 1.60 | 0.10 | 0.50 | 0.10 | 0.20 | 0.90 | 0.60 |

TABLE 1-continued

| | | Component composition (mass ratio) | | | | | | | | | | | | | |
|---|---|---|---|---|---|---|---|---|---|---|---|---|---|---|---|
| | | Cu % | P ppm | Total of 3 elements ppm | Pb ppm | Se ppm | Te ppm | S ppm | Total of 7 elements ppm | Mg ppm | Sr ppm | Ba ppm | Ti ppm | Zr ppm | Hf ppm | Y ppm |
| | 18 | 99.96 or more | 0.50 | 5.8 | 2.6 | 1.5 | 1.7 | 10.6 | 3.7 | 0.80 | 0.50 | 0.50 | 1.00 | 0.20 | 0.30 | 0.40 |
| | 19 | 99.96 or more | 1.40 | 4.4 | 1.9 | 0.2 | 2.3 | 5.6 | 7.7 | 2.80 | 0.20 | 0.40 | 1.60 | 1.00 | 0.90 | 0.80 |
| | 20 | 99.96 or more | 1.10 | 6.8 | 2.4 | 1.6 | 2.8 | 8.2 | 4.6 | 1.00 | 0.10 | 0.10 | 1.40 | 0.80 | 1.00 | 0.20 |

TABLE 2

| | | Component composition (mass ratio) | | | | | | | | | | | | | |
|---|---|---|---|---|---|---|---|---|---|---|---|---|---|---|---|
| | | Cu % | P ppm | Total of 3 elements ppm | Pb ppm | Se ppm | Te ppm | S ppm | Total of 7 elements ppm | Mg ppm | Sr ppm | Ba ppm | Ti ppm | Zr ppm | Hf ppm | Y ppm |
| Invention Examples | 21 | 99.96 or more | 1.80 | 7.4 | 2.8 | 2.6 | 2.0 | 20.0 | 6.9 | 2.70 | 0.50 | 0.20 | 1.80 | 0.70 | 0.70 | 0.30 |
| | 22 | 99.96 or more | 1.80 | 5.4 | 1.6 | 2.2 | 1.6 | 11.5 | 2.6 | 0.10 | 0.10 | 0.40 | 0.10 | 0.80 | 0.20 | 0.90 |
| | 23 | 99.96 or more | 1.10 | 6.2 | 1.8 | 1.9 | 2.5 | 5.2 | 6.9 | 2.70 | 0.30 | 0.30 | 1.70 | 0.90 | 0.80 | 0.20 |
| | 24 | 99.96 or more | 1.40 | 2.8 | 0.7 | 1.7 | 0.4 | 20.0 | 6.6 | 2.20 | 0.30 | 0.40 | 1.70 | 0.40 | 0.90 | 0.70 |
| | 25 | 99.96 or more | 0.40 | 7.0 | 2.9 | 2.5 | 1.6 | 7.2 | 5.6 | 2.00 | 0.10 | 0.40 | 1.90 | 0.40 | 0.40 | 0.40 |
| | 26 | 99.96 or more | 1.70 | 2.9 | 0.4 | 2.3 | 0.2 | 13.4 | 5.6 | 1.70 | 0.20 | 0.20 | 1.40 | 0.40 | 1.00 | 0.70 |
| | 27 | 99.96 or more | 1.10 | 4.6 | 2.0 | 0.7 | 1.9 | 14.5 | 2.5 | 0.60 | 0.10 | 0.50 | 0.40 | 0.20 | 0.60 | 0.10 |
| | 28 | 99.96 or more | 0.40 | 5.1 | 1.7 | 0.6 | 2.8 | 20.0 | 10.3 | 4.50 | 0.60 | 0.40 | 1.30 | 0.90 | 1.30 | 1.30 |
| | 29 | 99.96 or more | 1.50 | 5.2 | 0.5 | 1.8 | 2.9 | 17.9 | 5.4 | 1.10 | 0.50 | 0.40 | 1.10 | 0.90 | 1.00 | 0.40 |
| | 30 | 99.96 or more | 0.70 | 4.6 | 1.7 | 0.6 | 2.3 | 7.8 | 6.1 | 3.00 | 0.40 | 0.10 | 1.30 | 0.50 | 0.70 | 0.10 |
| | 31 | 99.96 or more | 0.70 | 2.1 | 1.0 | 0.7 | 0.4 | 6.9 | 3.8 | 0.60 | 0.30 | 0.20 | 0.80 | 0.40 | 0.80 | 0.70 |
| | 32 | 99.96 or more | 1.40 | 4.3 | 0.4 | 2.0 | 1.9 | 3.2 | 5.1 | 2.60 | 0.50 | 0.50 | 0.80 | 0.10 | 0.50 | 0.10 |
| | 33 | 99.96 or more | 0.05 | 1.1 | 0.8 | 0.2 | 0.1 | 4.0 | 0.3 | 0.10 | 0.02 | 0.00 | 0.00 | 0.10 | 0.00 | 0.10 |
| | 34 | 99.96 or more | 0.04 | 1.6 | 1.2 | 0.3 | 0.1 | 4.0 | 0.4 | 0.10 | 0.10 | 0.00 | 0.10 | 0.01 | 0.10 | 0.00 |
| | 35 | 99.96 or more | 0.05 | 0.9 | 0.6 | 0.2 | 0.1 | 4.0 | 0.9 | 0.20 | 0.10 | 0.10 | 0.20 | 0.10 | 0.10 | 0.10 |
| | 36 | 99.96 or more | 0.03 | 1.5 | 1.2 | 0.2 | 0.1 | 4.0 | 1.0 | 0.00 | 0.20 | 0.10 | 0.10 | 0.20 | 0.20 | 0.20 |
| | 37 | 99.96 or more | 0.04 | 1.2 | 0.8 | 0.2 | 0.2 | 4.0 | 3.3 | 2.00 | 0.10 | 0.30 | 0.20 | 0.20 | 0.40 | 0.10 |
| Comparative Examples | 1 | 99.96 or more | 5.00 | 6.8 | 0.8 | 3.0 | 3.0 | 14.1 | 12.1 | 5.00 | 1.20 | 3.00 | 1.60 | 0.30 | 0.50 | 0.50 |
| | 2 | 99.96 or more | 1.60 | 23.5 | 4.2 | 9.8 | 9.5 | 2.0 | 2.2 | 1.00 | 0.40 | 0.20 | 0.10 | 0.30 | 0.10 | 0.10 |
| | 3 | 99.96 or more | 1.80 | 22.7 | 2.8 | 10.3 | 9.6 | 17.0 | 4.0 | 1.30 | 0.80 | 0.50 | 0.50 | 0.40 | 0.30 | 0.20 |

TABLE 3

| | | Hot rolling | Cold rolling | Recrystallization heat treatment | | Temper rolling | |
|---|---|---|---|---|---|---|---|
| | | Temperature °C. | Rolling rate % | Temperature °C. | Time sec. | Rolling rate % | Thickness mm |
| Invention Examples | 1 | 750 | 91 | 280 | 25000 | 6 | 1.0 |
| | 2 | 790 | 95 | 290 | 29000 | 16 | 0.5 |
| | 3 | 770 | 93 | 370 | 30000 | 8 | 1.0 |
| | 4 | 790 | 95 | 380 | 28000 | 14 | 0.5 |
| | 5 | 810 | 91 | 630 | 5 | 8 | 1.0 |
| | 6 | 800 | 93 | 620 | 5 | 14 | 1.0 |
| | 7 | 780 | 91 | 640 | 10 | 10 | 1.0 |
| | 8 | 810 | 91 | 630 | 10 | 15 | 1.0 |
| | 9 | 790 | 91 | 640 | 5 | — | 2.0 |
| | 10 | 790 | 91 | 600 | 180 | 8 | 1.0 |
| | 11 | 800 | 92 | 570 | 3600 | 14 | 1.0 |
| | 12 | 750 | 92 | 650 | 5 | 30 | 1.0 |
| | 13 | 840 | 92 | 610 | 10 | — | 1.0 |
| | 14 | 830 | 91 | 650 | 10 | 8 | 2.0 |
| | 15 | 820 | 94 | 590 | 60 | 15 | 1.0 |
| | 16 | 840 | 93 | 630 | 10 | 28 | 1.0 |
| | 17 | 820 | 95 | 630 | 30 | — | 1.0 |
| | 18 | 830 | 92 | 580 | 7200 | 6 | 1.0 |
| | 19 | 760 | 91 | 640 | 30 | 14 | 1.0 |
| | 20 | 760 | 94 | 650 | 15 | 31 | 0.5 |

TABLE 4

|  |  | Hot rolling Temperature ° C. | Cold rolling Rolling rate % | Recrystallization heat treatment Temperature ° C. | Recrystallization heat treatment Time sec. | Temper rolling Rolling rate % | Thickness mm |
|---|---|---|---|---|---|---|---|
| Invention Examples | 21 | 850 | 95 | 630 | 60 | — | 0.5 |
|  | 22 | 760 | 93 | 680 | 10 | 6 | 1.0 |
|  | 23 | 780 | 92 | 620 | 120 | 14 | 1.0 |
|  | 24 | 800 | 92 | 600 | 360 | 29 | 1.0 |
|  | 25 | 850 | 91 | 640 | 1800 | — | 2.0 |
|  | 26 | 830 | 92 | 620 | 2500 | 8 | 1.0 |
|  | 27 | 750 | 94 | 640 | 1800 | 16 | 1.0 |
|  | 28 | 760 | 93 | 600 | 3600 | 30 | 1.0 |
|  | 29 | 770 | 92 | 630 | 3600 | — | 1.0 |
|  | 30 | 850 | 93 | 650 | 1800 | 6 | 0.5 |
|  | 31 | 820 | 91 | 700 | 480 | 16 | 0.5 |
|  | 32 | 790 | 95 | 850 | 10 | 45 | 0.5 |
|  | 33 | 800 | 90 | 850 | 5 | 5 | 3.0 |
|  | 34 | 800 | 90 | 850 | 5 | 10 | 2.0 |
|  | 35 | 800 | 90 | 800 | 5 | 7 | 2.0 |
|  | 36 | 800 | 90 | 800 | 5 | 14 | 1.0 |
|  | 37 | 800 | 90 | 750 | 5 | 10 | 1.5 |
| Comparative Examples | 1 | 800 | 92 | 600 | 5 | 40 | 1.0 |
|  | 2 | 800 | 85 | 620 | 60 | 20 | 2.0 |
|  | 3 | 800 | 90 | 590 | 30 | 25 | 1.0 |

TABLE 5

|  |  | Workability | Tensile strength MPa | Electrical conductivity % IACS | Before heat treatment Crystal grain size μm | Before heat treatment Aspect ratio | After heat treatment Crystal grain size μm | After heat treatment Variation of grain sizes |
|---|---|---|---|---|---|---|---|---|
| Invention Examples | 1 | A | 265 | 99 | 8 | 1.1 | 150 | ○ |
|  | 2 | A | 298 | 98 | 9 | 1.2 | 260 | ○ |
|  | 3 | A | 251 | 100 | 12 | 1.1 | 135 | ○ |
|  | 4 | B | 275 | 99 | 14 | 1.2 | 230 | ○ |
|  | 5 | B | 270 | 100 | 10 | 1.1 | 160 | ○ |
|  | 6 | B | 290 | 99 | 9 | 1.2 | 250 | ○ |
|  | 7 | B | 251 | 99 | 12 | 1.1 | 200 | ○ |
|  | 8 | B | 286 | 99 | 10 | 1.2 | 210 | ○ |
|  | 9 | A | 242 | 99 | 9 | 1.0 | 200 | ○ |
|  | 10 | A | 254 | 99 | 9 | 1.1 | 230 | ○ |
|  | 11 | A | 277 | 99 | 8 | 1.2 | 210 | ○ |
|  | 12 | A | 328 | 98 | 8 | 1.4 | 110 | ○ |
|  | 13 | A | 237 | 100 | 11 | 1.0 | 160 | ○ |
|  | 14 | B | 247 | 100 | 10 | 1.1 | 150 | ○ |
|  | 15 | B | 269 | 99 | 12 | 1.2 | 140 | ○ |
|  | 16 | A | 317 | 98 | 12 | 1.4 | 200 | ○ |
|  | 17 | A | 233 | 101 | 15 | 1.0 | 120 | ○ |
|  | 18 | A | 243 | 100 | 14 | 1.1 | 210 | ○ |
|  | 19 | A | 264 | 100 | 16 | 1.2 | 180 | ○ |
|  | 20 | B | 316 | 98 | 18 | 1.4 | 140 | ○ |

TABLE 6

|  |  | Workability | Tensile strength MPa | Electrical conductivity % IACS | Before heat treatment Crystal grain size μm | Before heat treatment Aspect ratio | After heat treatment Crystal grain size μm | After heat treatment Variation of grain sizes |
|---|---|---|---|---|---|---|---|---|
| Invention Examples | 21 | B | 231 | 100 | 19 | 1.0 | 190 | ○ |
|  | 22 | B | 241 | 99 | 17 | 1.1 | 160 | ○ |
|  | 23 | B | 245 | 100 | 16 | 1.2 | 130 | ○ |
|  | 24 | B | 297 | 98 | 19 | 1.4 | 186 | ○ |
|  | 25 | B | 224 | 102 | 31 | 1.0 | 135 | ○ |
|  | 26 | A | 230 | 101 | 30 | 1.1 | 230 | ○ |
|  | 27 | A | 245 | 100 | 28 | 1.2 | 280 | ○ |
|  | 28 | B | 297 | 99 | 32 | 1.4 | 275 | ○ |
|  | 29 | B | 225 | 101 | 41 | 1.0 | 220 | ○ |

TABLE 6-continued

|  |  | Workability | Tensile strength MPa | Electrical conductivity % IACS | Before heat Crystal grain size μm | Aspect ratio | After heat treatment Crystal grain size μm | Variation of grain sizes |
|---|---|---|---|---|---|---|---|---|
|  | 30 | A | 229 | 101 | 43 | 1.1 | 210 | ○ |
|  | 31 | A | 244 | 99 | 39 | 1.2 | 130 | ○ |
|  | 32 | A | 312 | 98 | 59 | 1.8 | 290 | ○ |
|  | 33 | A | 240 | 100 | 84 | 1.1 | 110 | ○ |
|  | 34 | A | 252 | 99 | 76 | 1.1 | 125 | ○ |
|  | 35 | A | 251 | 100 | 65 | 1.1 | 145 | ○ |
|  | 36 | A | 265 | 99 | 57 | 1.1 | 230 | ○ |
|  | 37 | A | 255 | 100 | 46 | 1.1 | 160 | ○ |
| Comparative Examples | 1 | A | 355 | 98 | 8 | 2.8 | 600 | x |
|  | 2 | C | 360 | 97 | 15 | 1.6 | 210 | x |
|  | 3 | D | 386 | 97 | 20 | 1.8 | 250 | x |

In Comparative Example 1, since the amount of P was larger than the range of the present embodiment, the average crystal grain size after the heat treatment of holding the pure copper plate at 800° C. for 1 hour was 600 μm which was coarse, and the variation of the grain sizes also became large.

In Comparative Examples 2 and 3, since the total amounts of Pb, Se, and Te were larger than the range of the present embodiment, the variation of the grain sizes after the heat treatment of holding the pure copper plate at 800° C. for 1 hour became large.

In contrast, in Invention Examples 1 to 37 in which the amount of P was 2 mass ppm or less and the total amount of Pb, Se, and Te was 10 mass ppm or less, the average crystal grain sizes after the heat treatment of holding the pure copper plate at 800° C. for 1 hour were small, and the variations of the grain sizes became small. Therefore, it was possible to suppress the crystal grains becoming coarse and nonuniform even during heating.

From the above-described results, it was confirmed that, according to the Invention Examples, it is possible to provide a pure copper plate that is excellent in terms of hot workability and is capable of suppressing crystal grains becoming coarse and nonuniform even after heating.

INDUSTRIAL APPLICABILITY

The pure copper plate of the present embodiment is excellent in terms of hot workability and suppresses the crystal grains becoming coarse and nonuniform even after heating. Therefore, the pure copper plate of the present embodiment is suitably applied as a material for electrical or electronic components (insulating circuit substrates) such as heat sinks, thick copper circuits, and the like, particularly, a material for electrical or electronic components for high-current uses.

What is claimed is:

1. A pure copper plate comprising:
Cu having a purity of 99.96 mass % or higher; and
a remainder being unavoidable impurities, wherein
an amount of P is 2 mass ppm or less,
a total amount of Pb, Se, and Te is 10 mass ppm or less,
an amount of S is in a range of 2 mass ppm or more and 20 mass ppm or less,
a grain size of crystal grains in a rolled surface is in a range of 46 μm or more and 300 μm or less,
an aspect ratio of crystal grains in a rolled surface is 1.1 or more and 2 or less, and
a tensile strength of the pure copper plate is 243 MPa or more and 500 MPa or lower.

2. The pure copper plate according to claim 1, wherein a total amount of Mg, Sr, Ba, Ti, Zr, Hf, and Y is 10 mass ppm or less.

3. The pure copper plate according to claim 1, wherein a crystal grain size after a heat treatment of holding the pure copper plate at 800° C. for 1 hour is in a range of 100 μm or more and 300 μm or less.

4. The pure copper plate according to claim 1, wherein a crystal grain size after the pure copper plate is heated at 800° C. or higher and joined to a ceramic substrate is in a range of 100 μm or more and 300 μm or less.

5. The pure copper plate according to claim 1, wherein a ratio $d_{max}/d_{ave}$ of a maximum crystal grain size $d_{max}$ to an average crystal grain size $d_{ave}$ within a range of 50 mm×50 mm after a heat treatment of holding the pure copper plate at 800° C. for 1 hour is 10 or less.

* * * * *